United States Patent
Zhai et al.

(10) Patent No.: US 11,757,830 B2
(45) Date of Patent: Sep. 12, 2023

(54) METHOD AND APPARATUS FOR ALLOCATING CTDB-BASED VIRTUAL IP ADDRESS, AND DISTRIBUTED STORAGE DEVICE

(71) Applicant: INSPUR SUZHOU INTELLIGENT TECHNOLOGY CO., LTD., Jiangsu (CN)

(72) Inventors: Yunlei Zhai, Jiangsu (CN); Duan Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/910,083

(22) PCT Filed: Jun. 24, 2020

(86) PCT No.: PCT/CN2020/098031
§ 371 (c)(1),
(2) Date: Sep. 8, 2022

(87) PCT Pub. No.: WO2021/179476
PCT Pub. Date: Sep. 16, 2021

(65) Prior Publication Data
US 2023/0119782 A1   Apr. 20, 2023

(30) Foreign Application Priority Data
Mar. 12, 2020   (CN) .......................... 202010172468.4

(51) Int. Cl.
*H04L 61/5007* (2022.01)
*G06F 16/27* (2019.01)
(Continued)

(52) U.S. Cl.
CPC .......... *H04L 61/5007* (2022.05); *G06F 16/27* (2019.01); *H04L 67/1097* (2013.01); *H04L 2101/686* (2022.05)

(58) Field of Classification Search
CPC ............................ H04L 61/5007; G06F 16/27
See application file for complete search history.

(56) References Cited

U.S. PATENT DOCUMENTS

| 2004/0246991 | A1  | 12/2004 | Tsuzuki et al. |
| 2016/0021026 | A1* | 1/2016  | Aron ..................... H04L 47/827 709/226 |
| 2016/0219016 | A1* | 7/2016  | Boucadair ........... H04L 61/5007 |

FOREIGN PATENT DOCUMENTS

| CN | 103475704 A | 12/2013 |
| CN | 108989476 A | 12/2013 |

(Continued)

OTHER PUBLICATIONS

International Search Report cited in PCT application PCT/CN2020/098031, dated Dec. 2, 2020, 5 pages.
(Continued)

*Primary Examiner* — Viet D Vu
(74) *Attorney, Agent, or Firm* — COOPER LEGAL GROUP, LLC (57) ABSTRACT

Disclosed are a Cluster Trivial Database (CTDB)-based virtual Internet Protocol (IP) address allocation method and apparatus, a distributed storage device, and a computer-readable storage medium. The method is applied to a distributed storage cluster. A known IP Version 4 (IPV4) virtual IP address parameter and available IPV4 virtual IP address parameter corresponding to an IPV4 virtual IP address and a known IP Version 6 (IPV6) virtual IP address parameter and available IPV6 virtual IP address parameter corresponding to an IPV6 virtual IP address may be acquired to obtain an IPV4 allocation result and an IPV6 allocation result by (Continued)

calculation respectively, and then virtual IP addresses are allocated to each normal node by use of the IPV4 allocation result and the IPV6 allocation result.

20 Claims, 3 Drawing Sheets

(51) Int. Cl.
*H04L 67/1097* (2022.01)
*H04L 101/686* (2022.01)

(56) References Cited

FOREIGN PATENT DOCUMENTS

| CN | 104486457 A | 4/2015 |
|---|---|---|
| CN | 106330610 A | 1/2017 |
| CN | 107104844 A | 8/2017 |
| CN | 107465562 A | 12/2017 |
| CN | 108848205 A | 11/2018 |
| CN | 108881512 A | 11/2018 |
| CN | 110519406 A | 11/2019 |

OTHER PUBLICATIONS

Written Opinion of International Searching Authority of corresponding PCT application PCT/CN2020/098031, dated Dec. 2, 2020, 8 pages.

First Office Action of corresponding CN priority application CN202010172468.4, dated Mar. 3, 2021, 7 pages.

Notification of Patent Grant of corresponding CN priority application CN202010172468.4, dated Aug. 9, 2021, 2 pages.

Li Miaomiao, "Research of the GlusterFS distributed storage system applied in the cloud rendering platform", A Thesis Submitted in Fulfillment of the Requirements for the Degree of Master of Engineering, Mar. 15, 2016; 82 pages, with English translation of Abstract.

\* cited by examiner

METHOD AND APPARATUS FOR ALLOCATING CTDB-BASED VIRTUAL IP ADDRESS, AND DISTRIBUTED STORAGE DEVICE

This application claims priority to Chinese Patent Application No. 202010172468.4, filed on Mar. 12, 2020, in China National Intellectual Property Administration and entitled "Method and Apparatus for Allocating CTDB-Based Virtual IP Address, and Distributed Storage Device", the contents of which are hereby incorporated by reference in its entirety.

FIELD

The present disclosure relates to a field of distributed storage technology, and particularly to a method and an apparatus for allocating a Cluster Trivial Database (CTDB) virtual Internet Protocol (IP) address, a distributed storage device, and a computer-readable storage medium.

BACKGROUND

A CTDB is a set of high-availability cluster management software. During a starting procedure of the CTDB, a CTDB master node reads configured virtual IP addresses from a virtual IP configuration file, and allocates the virtual IP addresses evenly and randomly to each normal node in a cluster according to a specified virtual IP address allocation algorithm. When some nodes in the cluster fails, the CTDB executes a failure switching to release the virtual IP address originally allocated to the failing node and then drifts the IP address to other normal nodes, and a corresponding read-write service is also drifted to the other normal nodes. When the node returns to normal and joins the cluster, the CTDB randomly selects and allocates a virtual IP address of another normal node to these nodes.

Virtual IP address allocation algorithms currently used by the CTDB master node include balanced allocation and random allocation. That is, it is ensured that virtual IP addresses held by each normal node are balanced in number (a difference between the numbers of the virtual IP addresses held by any two normal nodes is at most 1), the virtual IP addresses are allocated to each normal node randomly (it is unlikely to predict which the virtual IP addresses will be allocated to each node), and when a node joins the cluster after restarting, the CTDB randomly selects and allocates one or more virtual IP addresses to the node.

In the prior art, the CTDB master node allocates the virtual IP addresses without distinguishing an IP Version 4 (IPV4) address from an IP Version 6 (IPV6) address. That is, the IPV4 address is equivalent to the IPV6 address during virtual IP address allocation. When both the IPV4 address and the IPV6 address are configured in the virtual IP address, the IPV4 addresses are allocated to some normal nodes, and the IPV6 addresses are allocated to some other normal nodes. Therefore, how to ensure that the IPV4 addresses and the IPV6 addresses allocated to each normal node are relatively balanced in number, meet use requirements of some scenarios, and improve user experience is a problem urgent to be solved currently.

SUMMARY

An objective of the present disclosure is to provide a method and an apparatus for allocating a CTDB-based virtual IP address, a distributed storage device, and a computer-readable storage medium, thereby implementing separated allocation of IPV4 and IPV6 virtual IP addresses to ensure that the IPV4 and IPV6 virtual IP addresses allocated to each normal node are relatively balanced in number.

In order to solve the foregoing technical problem, the present disclosure provides a CTDB-based virtual IP address allocation method, applied to a distributed storage cluster and including:

acquiring, by a CTDB master node, a known IPV4 virtual IP address parameter, a known IPV6 virtual IP address parameter, an available IPV4 virtual IP address parameter, and an available IPV6 virtual IP address parameter, wherein the known IPV4 virtual IP address parameter includes a known IPV4 virtual IP address corresponding to each normal node;

performing virtual IP address allocation calculation by use of the known IPV4 virtual IP address parameter and the available IPV4 virtual IP address parameter to obtain an IPV4 allocation result;

performing virtual IP address allocation calculation by use of the known IPV6 virtual IP address parameter and the available IPV6 virtual IP address parameter to obtain an IPV6 allocation result; and performing virtual IP address allocation on each of the normal nodes according to the IPV4 allocation result and the IPV6 allocation result.

In some embodiments, the acquiring, by a CTDB master node, a known IPV4 virtual IP address parameter, a known IPV6 virtual IP address parameter, an available IPV4 virtual IP address parameter, and an available IPV6 virtual IP address parameter includes:

acquiring, by the CTDB master node, a known virtual IP address parameter and an available virtual IP address parameter, wherein the known virtual IP address parameter includes a known virtual IP address corresponding to each of the normal nodes, and the available virtual IP address parameter includes an available virtual IP address corresponding to each of the normal nodes; and separating the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter.

In some embodiments, when the known virtual IP address parameter and the available virtual IP address parameter are a known virtual IP address list and an available virtual IP address list respectively, the separating the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter includes:

traversing all known virtual IP addresses corresponding to each of the normal nodes in the known virtual IP address list, and recording a first number and a second number, wherein the first number is a number of known IPV4 virtual IP addresses in the known virtual IP address list, and the second number is a number of known IPV6 virtual IP addresses in the known virtual IP address list;

generating a known IPV4 virtual IP address list and a known IPV6 virtual IP address list corresponding to the known virtual IP address list according to the first number and the second number, wherein a length of the known IPV4 virtual IP address list is the first number, and a length of the known IPV6 virtual IP address list is the second number;

traversing all available virtual IP addresses corresponding to each of the normal nodes in the available virtual IP address list, and recording a third number and a fourth number, wherein the third number is a number of available IPV4 virtual IP addresses in the available virtual IP address list, and the fourth number is a number of available IPV6 virtual IP addresses in the available virtual IP address list; and generating an available IPV4 virtual IP address list and an available IPV6 virtual IP address list corresponding to the available virtual IP address list according to the third number and the fourth number, wherein a length of the available IPV4 virtual IP address list is the third number, and a length of the available IPV6 virtual IP address list is the fourth number.

In some embodiments, the performing virtual IP address allocation on each of the normal nodes according to the IPV4 allocation result and the IPV6 allocation result includes:

if the IPV4 allocation result is null, determining the IPV6 allocation result as a final allocation result, and performing the virtual IP address allocation on each of the normal nodes according to the final allocation result;

if the IPV6 allocation result is null, determining the IPV4 allocation result as the final allocation result, and performing the virtual IP address allocation on each of the normal nodes according to the final allocation result; and if both the IPV4 allocation result and the IPV6 allocation result are not null, connecting the IPV6 allocation result to the IPV4 allocation result to generate the final allocation result, and performing the virtual IP address allocation on each of the normal nodes according to the final allocation result.

In some embodiments, before the performing virtual IP address allocation calculation by use of the known IPV4 virtual IP address parameter and the available IPV4 virtual IP address parameter to obtain an IPV4 allocation result, the method further includes:

determining whether a condition is satisfied that the known IPV4 virtual IP address parameter includes a known IPV4 virtual IP address corresponding to a target node or whether the available IPV4 virtual IP address parameter includes an available IPV4 virtual IP address corresponding to any of the normal nodes, wherein the target node is any of the normal nodes, and the target node currently holds an IPV4 virtual IP address;

if YES, performing the virtual IP address allocation calculation by use of the known IPV4 virtual IP address parameter and the available IPV4 virtual IP address parameter to obtain the IPV4 allocation result; and if NO, performing the virtual IP address allocation calculation by use of the known IPV6 virtual IP address parameter and the available IPV6 virtual IP address parameter to obtain the IPV6 allocation result.

In some embodiments, a number of known IPV4 virtual IP addresses in the known IPV4 virtual IP address parameter is an integral multiple of a number of the normal nodes, and a number of known IPV6 virtual IP addresses in the known IPV6 virtual IP address parameter is an integral multiple of the number of the normal nodes.

In some embodiments, before the performing virtual IP address allocation on each of the normal nodes according to the IPV4 allocation result and the IPV6 allocation result, the method includes:

determining whether the normal nodes include a reallocation node according to the IPV4 allocation result and the IPV6 allocation result, wherein a number of virtual IP addresses corresponding to the reallocation node is larger than a number of virtual IP addresses corresponding to an allocation target node by 2, and the allocation target node is any of the normal nodes;

if NO, performing the step of performing virtual IP address allocation on each of the normal nodes according to the IPV4 allocation result and the IPV6 allocation result; and if YES, allocating one of IPV4 virtual IP addresses corresponding to the reallocation node in the IPV4 allocation result to a corresponding allocation target node, or allocating one of IPV6 virtual IP addresses corresponding to the reallocation node in the IPV6 allocation result to the corresponding allocation target node.

The present disclosure also provides a CTDB-based virtual IP address allocation apparatus, applied to a distributed storage cluster and including:

an acquisition module, configured to acquire a known IPV4 virtual IP address parameter, a known IPV6 virtual IP address parameter, an available IPV4 virtual IP address parameter, and an available IPV6 virtual IP address parameter, wherein the known IPV4 virtual IP address parameter includes a known IPV4 virtual IP address corresponding to each of the normal nodes;

a first allocation calculation module, configured to perform virtual IP address allocation calculation by use of the known IPV4 virtual IP address parameter and the available IPV4 virtual IP address parameter to obtain an IPV4 allocation result;

a second allocation calculation module, configured to perform virtual IP address allocation calculation by use of the known IPV6 virtual IP address parameter and the available IPV6 virtual IP address parameter to obtain an IPV6 allocation result; and an allocation module, configured to perform virtual IP address allocation on each of the normal nodes according to the IPV4 allocation result and the IPV6 allocation result.

In some embodiments, the acquisition module includes:

an acquisition submodule, configured to acquire a known virtual IP address parameter and an available virtual IP address parameter, wherein the known virtual IP address parameter includes a known virtual IP address corresponding to each of the normal nodes, and the available virtual IP address parameter includes an available virtual IP address corresponding to each of the normal nodes; and a separation submodule, configured to separate the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter.

In some embodiments, when the known virtual IP address parameter and the available virtual IP address parameter are a known virtual IP address list and an available virtual IP address list respectively, the separation submodule includes:

a first traversing unit, configured to traverse all known virtual IP addresses corresponding to each of the normal nodes in the known virtual IP address list, and record a first number and a second number, wherein the first number is a number of known IPV4 virtual IP addresses in the known virtual IP address list, and the second number is a number of known IPV6 virtual IP addresses in the known virtual IP address list;

a first generation unit, configured to generate a known IPV4 virtual IP address list and known IPV6 virtual IP address list corresponding to the known virtual IP address list according to the first number and the second number, wherein a length of the known IPV4 virtual IP address list is the first number, and a length of the known IPV6 virtual IP address list is the second number;

a second traversing unit, configured to traverse all available virtual IP addresses corresponding to each of the normal nodes in the available virtual IP address list, and record a third number and a fourth number, wherein the third number is a number of available IPV4 virtual IP addresses in the available virtual IP address list, and the fourth number is a number of available IPV6 virtual IP addresses in the available virtual IP address list; and a second generation unit, configured to generate an available IPV4 virtual IP address list and available IPV6 virtual IP address list corresponding to the available virtual IP address list according to the third number and the fourth number, wherein a length of the available IPV4 virtual IP address list is the third number, and a length of the available IPV6 virtual IP address list is the fourth number.

In some embodiments, the allocation module includes:

a first allocation submodule, configured to, if the IPV4 allocation result is null, determine the IPV6 allocation result as a final allocation result, and perform virtual IP address allocation on each of the normal nodes according to the final allocation result;

a second allocation submodule, configured to, if the IPV6 allocation result is null, determine the IPV4 allocation result as the final allocation result, and perform virtual IP address allocation on each of the normal nodes according to the final allocation result; and a third allocation submodule, configured to, if both the IPV4 allocation result and the IPV6 allocation result are not null, connect the IPV6 allocation result to the IPV4 allocation result to generate the final allocation result, and perform virtual IP address allocation on each of the normal nodes according to the final allocation result.

In some embodiments, the apparatus further includes:

a determination module, configured to determine whether the normal nodes include a reallocation node according to the IPV4 allocation result and the IPV6 allocation result, wherein a number of virtual IP addresses corresponding to the reallocation node is larger than that of virtual IP addresses corresponding to an allocation target node by 2, and the allocation target node is any normal node, and if NO, send a starting signal to the allocation module; and a reallocation module, configured to, if the normal nodes include the reallocation node, allocate one of IPV4 virtual IP addresses corresponding to the reallocation node in the IPV4 allocation result to the corresponding allocation target node, or allocate one of IPV6 virtual IP addresses corresponding to the reallocation node in the IPV6 allocation result to the corresponding allocation target node.

The present disclosure also provides a distributed storage device, including:

a memory, configured to store a computer program; and a processor, configured to execute the computer program to implement any steps of the CTDB-based virtual IP address allocation method as described above.

In addition, the present disclosure also provides a computer-readable storage medium, storing a computer program that is executed by a processor to implement any steps of the CTDB-based virtual IP address allocation method as described above.

The present disclosure provides a CTDB-based virtual IP address allocation method, applied to a distributed storage cluster. A known IPV4 virtual IP address parameter and available IPV4 virtual IP address parameter corresponding to an IPV4 virtual IP address and a known IPV6 virtual IP address parameter and available IPV6 virtual IP address parameter corresponding to an IPV6 virtual IP address may be acquired to obtain an IPV4 allocation result and an IPV6 allocation result by calculation respectively, and then virtual IP addresses are allocated to each of the normal nodes by use of the IPV4 allocation result and the IPV6 allocation result. As such, separated allocation of IPV4 and IPV6 virtual IP addresses is implemented to ensure that the IPV4 and IPV6 virtual IP addresses allocated to each of the normal nodes are relatively balanced in number, meet use requirements of some scenarios, and improve user experience. In addition, the present disclosure also provides a CTDB-based virtual IP address allocation apparatus, a distributed storage device, and a computer-readable storage medium, which also have the above beneficial effects.

BRIEF DESCRIPTION OF THE DRAWINGS

In order to describe technical solutions in embodiments of the present disclosure or the prior art more clearly, drawings required to be used in descriptions about the embodiments or the prior art will be introduced briefly below. Apparently, the drawings in the description below are merely embodiments of the present disclosure. Those ordinarily skilled in the art may further obtain other drawings according to the provided drawings without creative work.

DETAILED DESCRIPTION

In order to make objectives, technical solutions, and advantages of embodiments of the present disclosure clearer, the technical solutions in the embodiments of the present disclosure will be described clearly and completely below in combination with drawings in the embodiments of the present disclosure. Clearly, described embodiments are not all but part of the embodiments of the present disclosure. All other embodiments obtained by those ordinarily skilled in the art based on the embodiments in the present disclosure without creative work shall fall within the scope of protection of the present disclosure.

Figure 1:
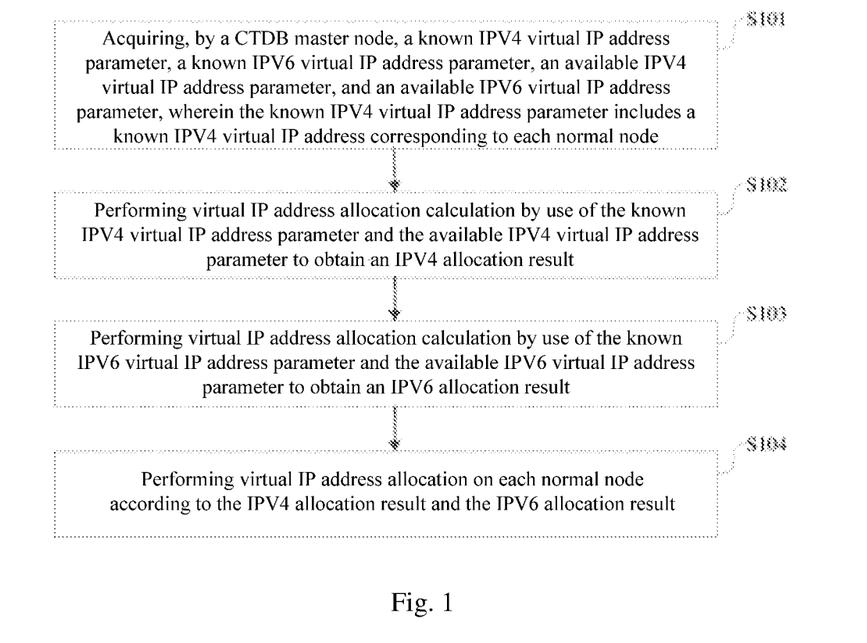
FIG. 1 is a flowchart of a method for allocating a CTDB-based virtual IP address according to an embodiment of the present disclosure.

Please refer to FIG. 1, FIG. 1 is a flowchart of a method for allocating a CTDB-based virtual IP address according to an embodiment of the present disclosure. The method is applied to a distributed storage cluster, and may include following steps.

In step 101, a CTDB master node acquires a known IPV4 virtual IP address parameter, a known IPV6 virtual IP address parameter, an available IPV4 virtual IP address parameter, and an available IPV6 virtual IP address parameter, wherein the known IPV4 virtual IP address parameter includes a known IPV4 virtual IP address corresponding to each normal node.

Wherein, the CTDB master node in the step may be a node in the distributed storage cluster that runs a CTDB software program to perform virtual IP address allocation on a normal node. In an embodiment, a selection of the CTDB master node is not limited. For example, the CTDB master node may be disposed in a same or similar manner as the CTDB master node in the prior art.

In some embodiments, the known IPV4 virtual IP address parameter and the available IPV4 virtual IP address parameter in the step may be two variables mainly used by the CTDB master node during IPV4 virtual IP address allocation calculation. The known IPV4 virtual IP address parameter may include a known IPV4 virtual IP address corresponding to each normal node, and the available IPV4 virtual IP address parameter may include an available IPV4 virtual IP address corresponding to each normal node. The known IPV6 virtual IP address parameter and the available IPV6 virtual IP address parameter in the step may be two variables mainly used by the CTDB master node during IPV6 virtual IP address allocation calculation. The known IPV6 virtual IP address parameter may include a known IPV6 virtual IP address corresponding to each normal node, and the available IPV6 virtual IP address parameter may include an available IPV6 virtual IP address corresponding to each normal node. Contents of the known IPV4 virtual IP address parameter, the known IPV6 virtual IP address parameter, the available IPV4 virtual IP address parameter, and the available IPV6 virtual IP address parameter in the step may be disposed by a designer. For example, they may be set correspondingly in a manner the same as or similar to that for a known virtual IP address parameter and available virtual IP address parameter needed to perform virtual IP address allocation calculation without distinguishing IPV4 from IPV6 in the prior art. No limits are made thereto in the present embodiment, as long as it is ensured that, by a virtual IP address allocation calculation method in the prior art, such as calling a virtual IP address allocation algorithm, virtual IP address allocation calculation may be performed on IPV4 virtual IP addresses by use of the known IPV4 virtual IP address parameter and the available IPV4 virtual IP address parameter, and virtual IP address allocation calculation may be performed on IPV6 virtual IP addresses by use of the known IPV6 virtual IP address parameter and the available IPV6 virtual IP address parameter.

Correspondingly, a manner that the CTDB master node acquires the known IPV4 virtual IP address parameter, the known IPV6 virtual IP address parameter, the available IPV4 virtual IP address parameter, and the available IPV6 virtual IP address parameter in the step may be set by the designer according to a practical scenario and a user requirement. For example, the CTDB master node may acquire a known virtual IP address parameters and an available virtual IP address parameter first, and then separate IPV4 parts and IPV6 parts in the known virtual IP address parameter and the available virtual IP address parameter respectively to obtain the known IPV4 virtual IP address parameter, known IPV6 virtual IP address parameter, the available IPV4 virtual IP address parameter, and the available IPV6 virtual IP address parameter. That is, the step may include following steps: the CTDB master node acquires a known virtual IP address parameter and an available virtual IP address parameter, wherein the known virtual IP address parameter includes a known virtual IP address corresponding to each normal node, and the available virtual IP address parameter includes an available virtual IP address corresponding to each normal node; and the known virtual IP address parameter and the available virtual IP address parameter are separated respectively to obtain the known IPV4 virtual IP address parameter, the known IPV6 virtual IP address parameter, the available IPV4 virtual IP address parameter, and the available IPV6 virtual IP address parameter. The CTDB master node may further directly acquire the known IPV4 virtual IP address parameter and available IPV4 virtual IP address parameter corresponding to an IPV4 virtual IP address and the known IPV6 virtual IP address parameter and available IPV6 virtual IP address parameter corresponding to an IPV6 virtual IP address according to a similar method for acquiring a known virtual IP address parameter and an available virtual IP address parameter in the prior art.

It can be understood that the known virtual IP address parameter and the available virtual IP address parameter may be two variables mainly used by the CTDB master node during virtual IP address allocation in the prior art. The known virtual IP address parameter may include a known virtual IP address corresponding to each normal node, and the available virtual IP address parameter may include an available virtual IP address corresponding to each normal node. For example, when the known virtual IP address parameter is a known virtual IP address list (known_ips), each element known_ips[i] in known_ips corresponds to a known virtual IP address list (i.e., a node known virtual IP address list) on normal node i, and the node known virtual IP address list corresponds to a virtual IP address configuration file. That is, a number of virtual IP addresses configured on node i is the same as that of virtual IP addresses in the node known virtual IP address list of node i. When the available virtual IP address parameter is an available virtual IP address list (available_ips), each element available_ips[i] in available_ips corresponds to an available virtual IP address list (i.e., a node available virtual IP address list) on a normal node. Each available virtual IP address is first a known virtual IP address on this normal node, and then needs to satisfy the following conditions: 1: the CTDB currently runs normally rather than booted; 2: the virtual IP address is not deleted and not being deleted; and 3: a network card corresponding to the virtual IP address is in a normal state rather than a failure state.

Figure 2:
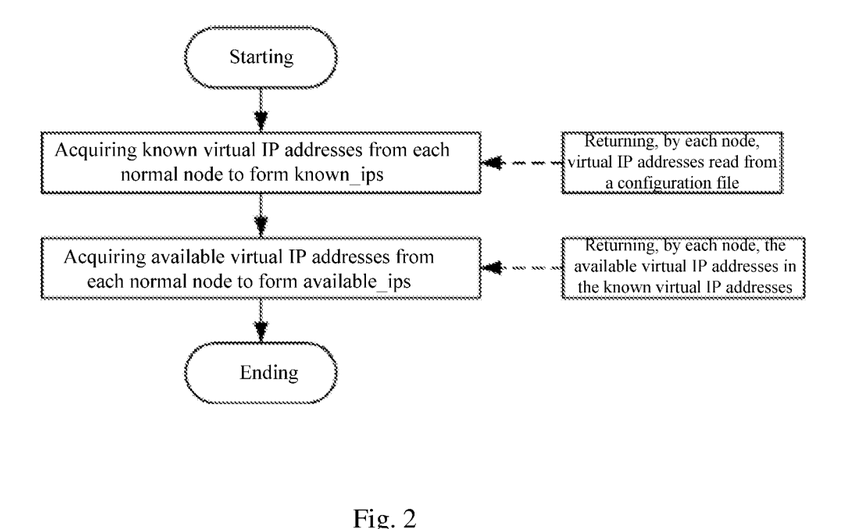
FIG. 2 is a flowchart of acquiring a known virtual IP address parameter and an available virtual IP address parameter in another method for allocating the CTDB-based virtual IP address according to an embodiment of the present disclosure.

Correspondingly, a manner that the CTDB master node acquires the known virtual IP address parameter and the available virtual IP address parameter is not limited in the present embodiment. As shown in FIG. 2, when the known virtual IP address parameter is a known virtual IP address list (known_ips), and the available virtual IP address parameter is an available virtual IP address list (available_ips), first, the CTDB master node may send a message to all normal nodes to acquire a known virtual IP address list (i.e., a node known virtual IP address list) of each normal node read from a virtual IP address configuration file when the CTDB is booted. After receiving data (i.e., node known virtual IP address lists) returned by all the normal nodes, the CTDB master node organizes all the data in known_ips. Herein, known_ips[i].num may represent the number of known virtual IP addresses on a $i^{th}$, node (normal node), known_ips[i].ip may represent the node known virtual IP address list of the $i^{th}$ node, each element (pnn, addr) in the list may represent that the virtual IP addr is currently held by node pnn, known_ips[i].ip[j].pnn corresponds to pnn, i.e., a node number, of a $j^{th}$ element, and known_ips[i].ip[j].addr corresponds to addr, i.e., a virtual IP address, of the $j^{th}$ element. Then, the CTDB master node may send a message to all the normal nodes to acquire their node available virtual IP address lists. After receiving the message, each node checks the node known virtual IP address list, and organizes available virtual IP addresses in the node available virtual IP address list for returning. After receiving data (i.e., node available virtual IP address lists) returned by all the normal nodes, the CTDB master node organizes all the data in available_ips. Herein, available_ips[i].num may represent the number of available virtual IP addresses on the $i^{th}$ node, available_ips[i].ip may represent the available virtual IP address list of the $i^{th}$ node, each element (pnn, addr) in the list may represent that the virtual IP addr is currently held by node pnn, available_ips[i].ip[j].pnn corresponds to pnn, i.e., a node number, of a $j^{th}$ element, and available_ips[i].ip[j].addr corresponds to addr, i.e., a virtual IP address, of the $j^{th}$ element.

In some embodiments, storage formats of the known IPV4 virtual IP address parameter, the known IPV6 virtual IP address parameter, the available IPV4 virtual IP address parameter, the available IPV6 virtual IP address parameter, the known virtual IP address parameter, and the available virtual IP address parameter are not limited in the present embodiment. For example, when the known virtual IP address parameter is a known virtual IP address list (known_ips), a storage format of known_ips may be as follows:

node1(num_ips,ips((pnn1,addr1), (pnn2,addr2), . . . , (pnnn1,addrn1)))
node2(num_ips,ips((pnn1,addr1), (pnn2,addr2), . . . , (pnnn2,addrn2)))
. . .
noden(num_ips,ips((pnn1,addr1), (pnn2,addr2), . . . , (pnnnn,addrnn)))

It is to be noted that the CTDB master node may obtain the known IPV4 virtual IP address parameter and known IPV6 virtual IP address parameter similar to the known virtual IP address parameter and the available IPV4 virtual IP address parameter and available IPV6 virtual IP address parameter similar to the available virtual IP address parameter according to distinctive features (such as address descriptors) of an IPV4 virtual IP address and an IPV6 virtual IP address. For example, according to the distinctive features (such as the address descriptors) of the IPV4 virtual IP address and the IPV6 virtual IP address, the CTDB master node may separate the known virtual IP address parameter to obtain the known IPV4 virtual IP address parameter and the known IPV6 virtual IP address parameter, and separate the available virtual IP address parameter to obtain the available IPV4 virtual IP address parameter and the available IPV6 virtual IP address parameter.

In some embodiments, a manner for separating the known virtual IP address parameter and the available virtual IP address parameter to obtain the known IPV4 virtual IP address parameter, the known IPV6 virtual IP address parameter, the available IPV4 virtual IP address parameter, and the available IPV6 virtual IP address parameter may be set by the designer according to the practical scenario and the user requirement. For example, when the known virtual IP address parameter and the available virtual IP address parameter are a known virtual IP address list and an available virtual IP address list respectively, the CTDB master node may traverse all known virtual IP addresses corresponding to each normal node in the known virtual IP address list, record a first number and a second number, and generate a known IPV4 virtual IP address list (i.e., known IPV4 virtual IP address parameter) and known IPV6 virtual IP address list (i.e., known IPV6 virtual IP address parameter) corresponding to the known virtual IP address list according to the first number and the second number. The first number is a number of known IPV4 virtual IP addresses in the known virtual IP address list, and the second number is a number of known IPV6 virtual IP addresses in the known virtual IP address list. A length of the known IPV4 virtual IP address list is the first number, and a length of the known IPV6 virtual IP address list is the second number. Structures of the known IPV4 virtual IP address list and the known IPV6 virtual IP address list are the same as a structure of the known virtual IP address list. The known IPV4 virtual IP address list includes a known IPV4 virtual IP address corresponding to each normal node. The known IPV6 virtual IP address list includes a known IPV6 virtual IP address corresponding to each node. The CTDB master node may traverse all available virtual IP addresses corresponding to each normal node in the available virtual IP address list, record a third number and a fourth number, and generate an available IPV4 virtual IP address list (available IPV4 virtual IP address parameter) and available IPV6 virtual IP address list (available IPV6 virtual IP address parameter) corresponding to the available virtual IP address list according to the third number and the fourth number. The third number is a number of available IPV4 virtual IP addresses in the available virtual IP address list, and the fourth number is a number of available IPV6 virtual IP addresses in the available virtual IP address list. A length of the available IPV4 virtual IP address list is the third number, and a length of the available IPV6 virtual IP address list is the fourth number. Structures of the available IPV4 virtual IP address list and the available IPV6 virtual IP address list are the same as a structure of the available virtual IP address list. The available IPV4 virtual IP address list includes an available IPV4 virtual IP address corresponding to each normal node. The available IPV6 virtual IP address list includes an available IPV6 virtual IP address corresponding to each node.

Figure 3:
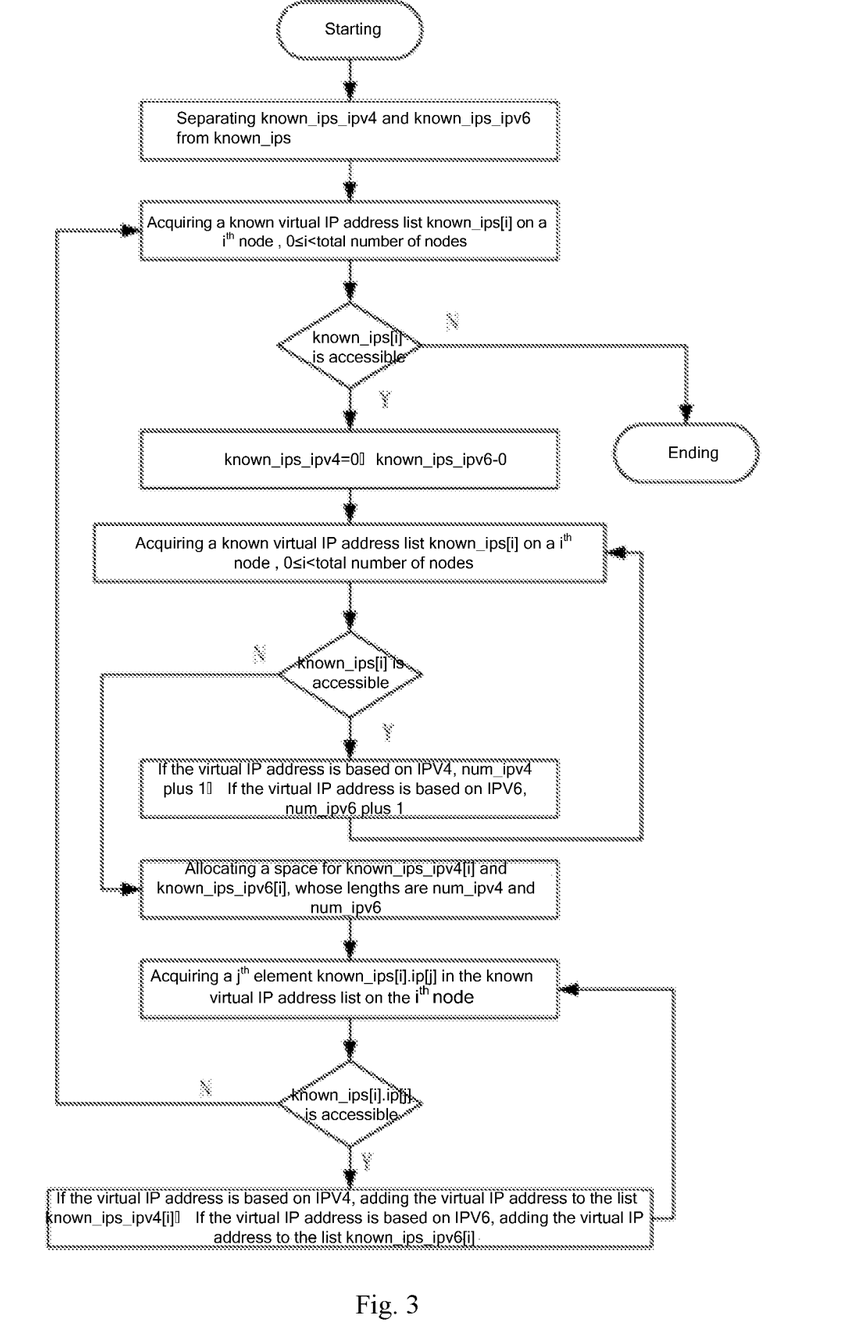
FIG. 3 is a flowchart of separating the known virtual IP address parameter and the available virtual IP address parameter in another method for allocating the CTDB-based virtual IP address according to an embodiment of the present disclosure.

As shown in FIG. 3, the known IPV4 virtual IP address list (known_ips_ipv4) and known IPV6 virtual IP address list (known_ips_ipv6) may be separated from the known virtual IP address list (known_ips) through the following process.

In S1, each element known_ips[i] (a node known virtual IP address list obtained from the $i^{th}$ node) in known_ips is traversed, and step S2 is performed for each element known_ ips[i].

In S2, known_ips[i].ip[j] (a $j^{th}$ known virtual IP address on the $i^{th}$ node) is traversed, and step S3 is performed for each known virtual IP address known_ips[i].ip[j] on a $i^{th}$ node.

In S3, if the current $j^{th}$ known virtual IP address is based on IPV4, a number (num_ipv4) of IPV4 virtual IP addresses in the known virtual IP address list of the $i^{th}$ node plus one is recorded. If the current $j^{th}$ known virtual IP address is based on IPV6, a number (num_ipv6) of IPV6 virtual IP addresses in the known virtual IP address list of the $i^{th}$ node plus one is recorded. After all known virtual IP addresses on the $i^{th}$ node are traversed, step S4 is performed. Herein, the address descriptor of the IPV4 virtual IP address is AF_INET4, and the address descriptor of the IPV6 virtual IP address is AF_INET6.

In S4, after the numbers of the IPV4 and IPV6 virtual IP addresses in the node known virtual IP address list on the $i^{th}$ node, two lists knows_ips_ipv4[i] and known_ips_ipv6[i] are separated from known_ips[i], whose structures are the same as that of known_ips[i] and lengths are num_ipv4 and num_ipv6 respectively, in some embodiments as step S5.

In S5, known_ips[i].ip[j] (the $j^{th}$ known virtual IP address on the $i^{th}$ node) is traversed, and step S6 is performed for each known virtual IP address known_ips[i].ip[j] on the $i^{th}$ node.

In S6, if the current $j^{th}$ known virtual IP address is based on IPV4, the $j^{th}$ known virtual IP address is added to the list known_ips_ipv4[i], and if the $j^{th}$ known virtual IP address is based on IPV6, the $j^{th}$ known virtual IP address is added to the list known_ips_ipv6[i].

In S7, after node known virtual IP address lists of all normal nodes are traversed through the above steps S1 to S6, known_ips_ipv4 and known_ips_ipv6 are separated from known_ips.

Correspondingly, a process of separating the available IPV4 virtual IP address list (available_ips_ipv4) and the available IPV6 virtual IP address list (available_ips_ipv6) from the available virtual IP address list (available_ips) corresponds to steps S1 to S7, and will not be elaborated herein.

In step 102, virtual IP address allocation calculation is performed by use of the known IPV4 virtual IP address parameter and the available IPV4 virtual IP address parameter to obtain an IPV4 allocation result.

It can be understood that an objective of the step is that the CTDB master node calls a virtual IP address allocation algorithm to perform virtual IP address allocation calculation by use of a parameter corresponding to a known IPV4 virtual IP address (known IPV4 virtual IP address parameter) of each normal node and a parameter corresponding to an available IPV4 virtual IP address (available IPV4 virtual IP address parameter) to obtain an IPV4 virtual IP address allocation result (IPV4 allocation result).

Correspondingly, a manner in a step for performing virtual IP address allocation calculation by use of the known IPV4 virtual IP address parameter and the available IPV4 virtual IP address parameter to obtain the IPV4 allocation result may be set by the designer. For example, a step is implemented in a manner the same as or similar to that of calling a virtual IP address allocation algorithm according to the known virtual IP address parameter and the available virtual IP address parameter to obtain a virtual IP address allocation result in the prior art, the difference is that the known virtual IP address parameter and the available virtual IP address parameter are replaced with the known IPV4 virtual IP address parameter and the available IPV4 virtual IP address parameter, and the other parameters needed to call the virtual IP address allocation algorithm remain unchanged or change correspondingly, thereby obtaining the IPV4 virtual IP address allocation result by calculation. No limits are made thereto in the present embodiment.

In some embodiments, the virtual IP address allocation algorithm in the step may be an algorithm used by the CTDB master node for virtual IP address allocation in the prior art, such as an ipalloc function. In the step, the CTDB master node may detect first whether IPV4 virtual IP address allocation conditions are satisfied: 1: the node known virtual IP address list of at least one normal node is obtained, the list includes IPV4 virtual IP addresses, and the normal node currently holds at least one IPV4 virtual IP address; and 2: the node available virtual IP address list of at least one normal node is obtained, and the list includes IPV4 virtual IP addresses. One of the above conditions needs to be satisfied. If the IPV4 virtual IP address allocation condition is satisfied, known_ips_ipv4 (the known IPV4 virtual IP address parameter) and available_ips_ipv4 (the available IPV4 virtual IP address parameter) are input to the ipalloc function for allocation to obtain all_ips_ipv4 (the IPV4 allocation result). Each element (pnn, addr) in available_ips_ipv4 represents that the node corresponding to node number pnn should hold the virtual IP addr.

That is, before the step, the method may further include following step: it is determined whether a condition is satisfied that the known IPV4 virtual IP address parameter includes a known IPV4 virtual IP address corresponding to a target node or the available IPV4 virtual IP address parameter includes an available IPV4 virtual IP address corresponding to any normal node, wherein the target node is any normal node, and the target node currently holds an IPV4 virtual IP address. If YES, the step is performed. If NO, step 103 is performed.

In step 103, virtual IP address allocation calculation is performed by use of the known IPV6 virtual IP address parameter and the available IPV6 virtual IP address parameter to obtain an IPV6 allocation result.

It can be understood that an objective of the step is that the CTDB master node calls a virtual IP address allocation algorithm by use of a parameter corresponding to a known IPV6 virtual IP address (known IPV6 virtual IP address parameter) of each normal node and a parameter corresponding to an available IPV6 virtual IP address (available IPV6 virtual IP address parameter) to obtain an IPV6 virtual IP address allocation result (IPV6 allocation result).

Correspondingly, before the step, the method may further include the following step: it is determined whether the known IPV6 virtual IP address parameter includes a known IPV6 virtual IP address corresponding to an IPV6 target node or whether the available IPV6 virtual IP address parameter includes an available IPV6 virtual IP address corresponding to any normal node, wherein the IPV6 target node is any normal node, and the IPV6 target node currently holds an IPV6 virtual IP address. If YES, the step is performed. If NO, step 104 is performed.

In some embodiments, a logical sequence of the step and step 102 is not limited in the present embodiment. Step 102 may be performed prior to the step, as shown in the present embodiment. Alternatively, the step may be performed prior to step 102. Alternatively, the two steps may be performed in parallel.

In step 104, virtual IP address allocation is performed on each normal node according to the IPV4 allocation result and the IPV6 allocation result.

It can be understood that an objective of the step is that the CTDB master node performs virtual IP address allocation on each normal node by use of the IPV4 virtual IP address allocation result (IPV4 allocation result) and IPV6 virtual IP address allocation result (the IPV6 allocation result) obtained by calling the virtual IP address allocation algorithm, thereby implementing separated allocation of IPV4 and IPV6 virtual IP addresses to ensure that IPV4 and IPV6 virtual IP addresses allocated to each normal node are relatively balanced in number.

In some embodiments, a manner in the step for performing virtual IP address allocation on each normal node according to the IPV4 allocation result and the IPV6 allocation result may be set by the designer. For example, a final allocation result may be generated first according to the IPV4 allocation result and the IPV6 allocation result, and then virtual IP address allocation is performed on each normal node according to the final allocation result. That is, the CTDB master node sends a message to each normal node according to the final allocation result to release a virtual IP address that the normal node should not hold and hold a virtual IP address that the normal node should hold. For example, if the IPV4 allocation result (all_ips_ipv4) is null, the IPV6 allocation result is determined as the final allocation result (all_ips), namely all_ips=all_ips_ipv6, and virtual IP address allocation is performed on each normal node according to the final allocation result. If the IPV6 allocation result (all_ips_ipv6) is null, the IPV4 allocation result is determined as the final allocation result, namely all_ips=all_ips_ipv4, and virtual IP address allocation is performed on each normal node according to the final allocation result. If both the IPV4 allocation result and the IPV6 allocation result are not null, the IPV6 allocation result is connected to the IPV4 allocation result to generate the final allocation result, namely all_ips=all_ips_ipv4, and virtual IP address allocation is performed on each normal node according to the final allocation result.

Correspondingly, when both the IPV4 allocation result and the IPV6 allocation result are not null, the IPV4 allocation result may be connected to the IPV6 allocation result to generate the final allocation result, namely all_ips=all_ips_ipv6, and virtual IP address allocation is performed on each normal node according to the final allocation result.

In some embodiments, storage formats of the IPV4 allocation result, the IPV6 allocation result, and the final allocation result (all_ips) are not limited in the present embodiment. For example, the storage format of all_ips may be as follows:

(pnn1,addr1)
(pnn2,addr2)
. . .
(pnnn,addrn)

It is to be noted that, in the present embodiment, relatively separated allocation calculation may be performed on IPV4 and IPV6 virtual IP addresses through steps 102 and 103, thereby ensuring that the IPV4 and IPV6 virtual IP addresses allocated to each normal node are relatively balanced in number, namely a difference between the numbers of IPV4 or IPV6 virtual IP addresses held by any two normal nodes is at most 1. To further ensure the balance of the virtual IP addresses held by each normal node in number and avoid the condition that the difference between the numbers of virtual IP addresses held by two normal nodes is 2, namely numbers of IPV4 and IPV6 virtual IP addresses held by one normal node are both larger than those of the other by 1, in the present embodiment, balanced allocation of the virtual IP addresses may be implemented based on set numbers of the IPV4 and/or IPV6 virtual IP addresses. For example, it may be set that the number of IPV4 virtual IP addresses and/or IPV6 virtual IP addresses that need to be allocated is an integral multiple of the number of normal nodes, namely the number of known IPV4 virtual IP addresses in the known IPV4 virtual IP address parameter is an integral multiple of the number of the normal nodes, and/or the number of known IPV6 virtual IP addresses in the known IPV6 virtual IP address parameter is an integral multiple of the number of the normal nodes. Therefore, the condition that the numbers of IPV4 and IPV6 virtual IP addresses held by one normal node are both larger than those of another by 1 after virtual IP address allocation is avoided.

Correspondingly, in the present embodiment, the IPV4 allocation result and the IPV6 allocation result may be analyzed and adjusted to ensure the balance of the virtual IP addresses held by each normal node in number. For example, when both the IPV4 allocation result and the IPV6 allocation result are not null, whether the normal nodes include a reallocation node may be determined according to the IPV4 allocation result and the IPV6 allocation result, namely whether there is a normal node (reallocation node) whose corresponding numbers of IPV4 and IPV6 virtual IP addresses are both larger than those of another normal node (allocation target node) by 1 is determined. The number of virtual IP addresses corresponding to the reallocation node is larger than that of virtual IP addresses corresponding to the allocation target node by 2, and the allocation target node is any normal node. If YES, virtual IP address allocation may be performed on each normal node directly according to the IPV4 allocation result and the IPV6 allocation result. If YES, one of IPV4 virtual IP addresses corresponding to the reallocation node in the IPV4 allocation result is allocated to the corresponding allocation target node, or one of IPV6 virtual IP addresses corresponding to the reallocation node in the IPV6 allocation result is allocated to the corresponding allocation target node. That is, the IPV4 allocation result and/or the IPV6 allocation result are/is adjusted to allocate an IPV4 or IPV6 virtual IP address corresponding to each reallocation node to a corresponding allocation target node. Therefore, the condition that the numbers of IPV4 and IPV6 virtual IP addresses held by one normal node are both larger than those of another by 1 after virtual IP address allocation is avoided. The reallocation nodes correspond to different allocation target nodes. If the number of reallocation nodes is larger than that of allocation target nodes, it is necessary to adjust the number of reallocation nodes to the number of allocation target nodes.

In the present embodiment of the present disclosure, a known IPV4 virtual IP address parameter and available IPV4 virtual IP address parameter corresponding to an IPV4 virtual IP address and a known IPV6 virtual IP address parameter and available IPV6 virtual IP address parameter corresponding to an IPV6 virtual IP address may be acquired to obtain an IPV4 allocation result and an IPV6 allocation result by calculation respectively, and then virtual IP addresses are allocated to each normal node by use of the IPV4 allocation result and the IPV6 allocation result. As such, separated allocation of IPV4 and IPV6 virtual IP addresses is implemented to ensure that the IPV4 and IPV6 virtual IP addresses allocated to each normal node are relatively balanced in number, meet use requirements of some scenarios, and improve user experience.

Figure 4:
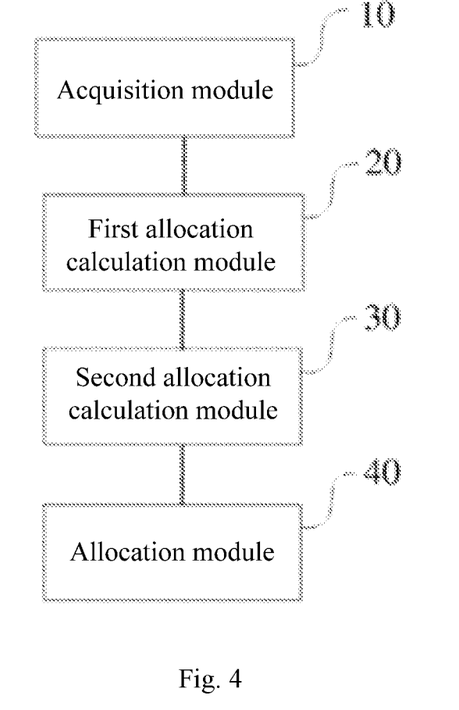
FIG. 4 is a structural block diagram of an apparatus for allocating a CTDB-based virtual IP address according to an embodiment of the present disclosure.

Referring to FIG. 4, FIG. 4 is a structural block diagram of a CTDB-based virtual IP address allocation apparatus according to an embodiment of the present disclosure. The apparatus is applied to a distributed storage cluster, and may include:

an acquisition module 10, configured to acquire a known IPV4 virtual IP address parameter, a known IPV6 virtual IP address parameter, an available IPV4 virtual IP address parameter, and an available IPV6 virtual IP address parameter, wherein the known IPV4 virtual IP address parameter includes a known IPV4 virtual IP address corresponding to each normal node;

a first allocation calculation module 20, configured to perform virtual IP address allocation calculation by use of the known IPV4 virtual IP address parameter and the available IPV4 virtual IP address parameter to obtain an IPV4 allocation result;

a second allocation calculation module 30, configured to perform virtual IP address allocation calculation by use of the known IPV6 virtual IP address parameter and the available IPV6 virtual IP address parameter to obtain an IPV6 allocation result; and an allocation module 40, configured to perform virtual IP address allocation on each normal node according to the IPV4 allocation result and the IPV6 allocation result.

In some embodiments, the acquisition module 10 may include:

an acquisition submodule, configured to acquire a known virtual IP address parameter and an available virtual IP address parameter, wherein the known virtual IP address parameter includes a known virtual IP address corresponding to each normal node, and the available virtual IP address parameter includes an available virtual IP address corresponding to each normal node; and a separation submodule, configured to separate the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter.

In some embodiments, when the known virtual IP address parameter and the available virtual IP address parameter are a known virtual IP address list and an available virtual IP address list respectively, the separation submodule may include:

a first traversing unit, configured to traverse all known virtual IP addresses corresponding to each normal node in the known virtual IP address list, and record a first number and a second number, wherein the first number is a number of known IPV4 virtual IP addresses in the known virtual IP address list, and the second number is a number of known IPV6 virtual IP addresses in the known virtual IP address list;

a first generation unit, configured to generate a known IPV4 virtual IP address list and known IPV6 virtual IP address list corresponding to the known virtual IP address list according to the first number and the second number, wherein a length of the known IPV4 virtual IP address list is the first number, a length of the known IPV6 virtual IP address list is the second number, structures of the known IPV4 virtual IP address list and the known IPV6 virtual IP address list are the same as that of the known virtual IP address list, the known IPV4 virtual IP address list includes the known IPV4 virtual IP address corresponding to each normal node, and the known IPV6 virtual IP address list includes a known IPV6 virtual IP address corresponding to each normal node;

a second traversing unit, configured to traverse all available virtual IP addresses corresponding to each normal node in the available virtual IP address list, and record a third number and a fourth number, wherein the third number is a number of available IPV4 virtual IP addresses in the available virtual IP address list, and the fourth number is a number of available IPV6 virtual IP addresses in the available virtual IP address list; and a second generation unit, configured to generate an available IPV4 virtual IP address list and available IPV6 virtual IP address list corresponding to the available virtual IP address list according to the third number and the fourth number, wherein a length of the available IPV4 virtual IP address list is the third number, a length of the available IPV6 virtual IP address list is the fourth number, structures of the available IPV4 virtual IP address list and the available IPV6 virtual IP address list are the same as that of the available virtual IP address list, the available IPV4 virtual IP address list includes an available IPV4 virtual IP address corresponding to each normal node, and the available IPV6 virtual IP address list includes an available IPV6 virtual IP address corresponding to each normal node.

In some embodiments, the allocation module 40 may include:

a first allocation submodule, configured to, if the IPV4 allocation result is null, determine the IPV6 allocation result as a final allocation result, and perform virtual IP address allocation on each normal node according to the final allocation result;

a second allocation submodule, configured to, if the IPV6 allocation result is null, determine the IPV4 allocation result as the final allocation result, and perform virtual IP address allocation on each normal node according to the final allocation result; and a third allocation submodule, configured to, if both the IPV4 allocation result and the IPV6 allocation result are not null, connect the IPV6 allocation result to the IPV4 allocation result to generate the final allocation result, and perform virtual IP address allocation on each normal node according to the final allocation result.

In some embodiments, a number of known IPV4 virtual IP addresses in the known IPV4 virtual IP address parameter is an integral multiple of a number of normal nodes, and a number of known IPV6 virtual IP addresses in the known IPV6 virtual IP address parameter is an integral multiple of the number of the normal nodes.

In some embodiments, the apparatus may further include:

a determination module, configured to determine whether the normal nodes include a reallocation node according to the IPV4 allocation result and the IPV6 allocation result, wherein a number of virtual IP addresses corresponding to the reallocation node is larger than that of virtual IP addresses corresponding to an allocation target node by 2, and the allocation target node is any normal node, and if NO, send a starting signal to the allocation module 40 according to the IPV4 allocation result and the IPV6 allocation result; and a reallocation module, configured to, if the normal nodes include the reallocation node, allocate one of IPV4 virtual IP addresses corresponding to the reallocation node in the IPV4 allocation result to the corresponding allocation target node, or allocate one of IPV6 virtual IP addresses corresponding to the reallocation node in the IPV6 allocation result to the corresponding allocation target node.

In some embodiments, the apparatus may further include:

an IPV4 allocation determination module, configured to determine whether a condition is satisfied that the known IPV4 virtual IP address parameter includes a known IPV4 virtual IP address corresponding to a target node or the available IPV4 virtual IP address parameter includes an available IPV4 virtual IP address corresponding to any normal node, wherein the target node is any normal node, and the target node currently holds an IPV4 virtual IP address, if YES, send a starting signal to the first allocation calculation module 20, and if NO, send a starting signal to the second allocation calculation module 30.

In the present embodiment of the present disclosure, a known IPV4 virtual IP address parameter and available IPV4 virtual IP address parameter corresponding to an IPV4 virtual IP address and a known IPV6 virtual IP address parameter and available IPV6 virtual IP address parameter corresponding to an IPV6 virtual IP address may be acquired by the acquisition module 10 to obtain an IPV4 allocation result and an IPV6 allocation result by calculation respectively, and then virtual IP addresses are allocated to each normal node by use of the IPV4 allocation result and the IPV6 allocation result. As such, separated allocation of IPV4 and IPV6 virtual IP addresses is implemented to ensure that the IPV4 and IPV6 virtual IP addresses allocated to each normal node are relatively balanced in number, meet use requirements of some scenarios, and improve user experience.

An embodiment of the present disclosure also provides a distributed storage device, including:
a memory, configured to store a computer program; and
a processor, configured to execute the computer program to implement any steps of the CTDB-based virtual IP address allocation method provided in the above-mentioned embodiment.

In the present embodiment, the memory includes a readable storage medium of at least one type. The readable storage medium includes a flash memory, a hard disk, a multimedia card, a card memory (such as a Secure Digital (SD) or Data Register (DX) memory), a magnetic memory, a magnetic disk, an optical disk, etc. In some embodiments, the memory may be an internal storage unit of the distributed storage device (such as a distributed storage server), such as a hard disk of a server. In some other embodiments, the memory may be an external storage device of the distributed storage device, such as a plug-in hard disk on a server, a Smart Media Card (SMC), an SD card, and a flash card. Further, the memory may also include both an internal storage unit of the distributed storage device and an external storage device. The memory may be configured not to store application software installed in the distributed storage device and various data, such as a program code that executes a CTDB-based virtual IP address allocation method, but also to temporarily store data that has been output or is to be output.

In some embodiments, the processor in the present embodiment may be a Central Processing Unit (CPU), a controller, a microcontroller, a microprocessor, or another data processing chip, and is configured to run a program code or processing data stored in the memory, such as a program code that executes a CTDB-based virtual IP address allocation method.

In addition, an embodiment of the present disclosure also provides a computer-readable storage medium, storing a computer program that is executed by a processor to implement any steps of the CTDB-based virtual IP address allocation method provided in the above-mentioned embodiment.

The computer-readable storage medium may include various media capable of storing program codes, such as a U disk, a mobile hard disk, a Read-Only Memory (ROM), a Random Access Memory (RAM), a magnetic disk, or an optical disk.

Each embodiment in the specification is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described relatively briefly, and related parts refer to the descriptions about the method.

Professionals may further realize that the units and algorithm steps of each example described in combination with the embodiments disclosed herein may be implemented by electronic hardware, computer software, or a combination thereof. In order to describe the interchangeability of hardware and software clearly, the compositions and steps of each example have been described generally above according to functions. Whether these functions are executed by hardware or software depends on applications and design constraints of the technical solutions. Professionals may realize the described functions for each application by use of different methods, but such realization shall fall within the scope of the present disclosure.

The CTDB-based virtual IP address allocation method and apparatus, distributed storage device, and computer-readable storage medium provided in the present disclosure are introduced above in detail. The principle and implementation modes of the present disclosure are described herein with specific examples, and the descriptions about the above embodiments are for helping understand the method and core idea of the present disclosure. It is to be pointed out that those ordinarily skilled in the art may further make a plurality of improvements and embellishments to the present disclosure without departing from the principle of the present disclosure, and these improvements and embellishments shall also fall within the scope of protection of the claims of the present disclosure.

The invention claimed is:

1. A method for allocating a virtual Internet Protocol (IP) address, being applied to a distributed storage cluster and comprising:
    acquiring, by a Cluster Trivial Database (CTDB) master node, a known IP Version 4 (IPV4) virtual IP address parameter, a known IP Version 6 (IPV6) virtual IP address parameter, an available IPV4 virtual IP address parameter, and an available IPV6 virtual IP address parameter, wherein the known IPV4 virtual IP address parameter comprises a known IPV4 virtual IP address corresponding to each of normal nodes;
    performing virtual IP address allocation calculation by use of the known IPV4 virtual IP address parameter and the available IPV4 virtual IP address parameter to obtain an IPV4 allocation result;
    performing virtual IP address allocation calculation by use of the known IPV6 virtual IP address parameter and the available IPV6 virtual IP address parameter to obtain an IPV6 allocation result; and
    performing virtual IP address allocation on each of the normal nodes according to the IPV4 allocation result and the IPV6 allocation result;
    wherein the performing virtual IP address allocation on each of the normal nodes according to the IPV4 allocation result and the IPV6 allocation result comprises:
        generating a final allocation result according to the IPV4 allocation result and the IPV6 allocation result; and
        performing virtual IP address allocation on each of the normal nodes according to the final allocation result.

2. The method for allocating the virtual IP address according to claim 1, wherein the acquiring, by a CTDB master node, a known IPV4 virtual IP address parameter, a known IPV6 virtual IP address parameter, an available IPV4 virtual IP address parameter, and an available IPV6 virtual IP address parameter comprises:
    acquiring, by the CTDB master node, a known virtual IP address parameter and an available virtual IP address parameter, wherein the known virtual IP address parameter comprises a known virtual IP address corresponding to each of the normal nodes, and the available virtual IP address parameter comprises an available virtual IP address corresponding to each of the normal nodes; and
    separating IPV4 parts and IPV6 parts in the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter.

3. The method for allocating the virtual IP address according to claim 2, wherein when the known virtual IP address parameter and the available virtual IP address parameter are a known virtual IP address list and an available virtual IP address list respectively, the separating IPV4 parts and IPV6 parts in the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter comprises:

traversing all known virtual IP addresses corresponding to each of the normal nodes in the known virtual IP address list, and recording a first number and a second number, wherein the first number is a number of known IPV4 virtual IP addresses in the known virtual IP address list, and the second number is a number of known IPV6 virtual IP addresses in the known virtual IP address list;

generating a known IPV4 virtual IP address list and a known IPV6 virtual IP address list corresponding to the known virtual IP address list according to the first number and the second number, wherein a length of the known IPV4 virtual IP address list is the first number, and a length of the known IPV6 virtual IP address list is the second number;

traversing all available virtual IP addresses corresponding to each of the normal nodes in the available virtual IP address list, and recording a third number and a fourth number, wherein the third number is a number of available IPV4 virtual IP addresses in the available virtual IP address list, and the fourth number is a number of available IPV6 virtual IP addresses in the available virtual IP address list; and generating an available IPV4 virtual IP address list and an available IPV6 virtual IP address list corresponding to the available virtual IP address list according to the third number and the fourth number, wherein a length of the available IPV4 virtual IP address list is the third number, and a length of the available IPV6 virtual IP address list is the fourth number.

4. The method for allocating the virtual IP address according to claim 1, wherein the performing virtual IP address allocation on each of the normal nodes according to the IPV4 allocation result and the IPV6 allocation result comprises:

in response to a determination that the IPV4 allocation result is null, determining the IPV6 allocation result as the final allocation result;

in response to a determination that the IPV6 allocation result is null, determining the IPV4 allocation result as the final allocation result; and in response to a determination that both the IPV4 allocation result and the IPV6 allocation result are not null, connecting the IPV6 allocation result to the IPV4 allocation result to generate the final allocation result.

5. The method for allocating the virtual IP address according to claim 1, wherein before the performing virtual IP address allocation calculation by use of the known IPV4 virtual IP address parameter and the available IPV4 virtual IP address parameter to obtain an IPV4 allocation result, the method further comprises:

determining whether a condition is satisfied that the known IPV4 virtual IP address parameter comprises a known IPV4 virtual IP address corresponding to a target node or the available IPV4 virtual IP address parameter comprises an available IPV4 virtual IP address corresponding to any of the normal nodes, wherein the target node is any of the normal nodes, and the target node currently holds an IPV4 virtual IP address;

in response to a determination that the condition is satisfied, performing the virtual IP address allocation calculation by use of the known IPV4 virtual IP address parameter and the available IPV4 virtual IP address parameter to obtain the IPV4 allocation result; and in response to a determination that the condition is not satisfied, performing the virtual IP address allocation calculation by use of the known IPV6 virtual IP address parameter and the available IPV6 virtual IP address parameter to obtain the IPV6 allocation result.

6. The method for allocating the virtual IP address according to claim 1, wherein a number of known IPV4 virtual IP addresses in the known IPV4 virtual IP address parameter is an integral multiple of a number of the normal nodes, and a number of known IPV6 virtual IP addresses in the known IPV6 virtual IP address parameter is an integral multiple of the number of the normal nodes.

7. The method for allocating the virtual IP address according to claim 1, wherein before the performing virtual IP address allocation on each of the normal nodes according to the IPV4 allocation result and the IPV6 allocation result, the method comprises:

determining whether the normal nodes comprise a reallocation node according to the IPV4 allocation result and the IPV6 allocation result, wherein a number of virtual IP addresses corresponding to the reallocation node is larger than a number of virtual IP addresses corresponding to an allocation target node by 2, and the allocation target node is any of the normal nodes;

in response to a determination that the normal nodes do not comprise the reallocation node, performing the virtual IP address allocation on each of the normal nodes according to the IPV4 allocation result and the IPV6 allocation result; and in response to a determination that the normal nodes comprise the reallocation node, allocating one of IPV4 virtual IP addresses corresponding to the reallocation node in the IPV4 allocation result to a corresponding allocation target node, or allocating one of IPV6 virtual IP addresses corresponding to the reallocation node in the IPV6 allocation result to the corresponding allocation target node.

8. A distributed storage device, comprising:
a memory, configured to store a computer program; and
a processor, configured to execute the computer program to:

acquire, by a Cluster Trivial Database (CTDB) master node, a known Internet Protocol (IP) Version 4 (IPV4) virtual IP address parameter, a known IP Version 6 (IPV6) virtual IP address parameter, an available IPV4 virtual IP address parameter, and an available IPV6 virtual IP address parameter, wherein the known IPV4 virtual IP address parameter comprises a known IPV4 virtual IP address corresponding to each of normal nodes;

perform virtual IP address allocation calculation by use of the known IPV4 virtual IP address parameter and the available IPV4 virtual IP address parameter to obtain an IPV4 allocation result;

perform virtual IP address allocation calculation by use of the known IPV6 virtual IP address parameter and the available IPV6 virtual IP address parameter to obtain an IPV6 allocation result; and perform virtual IP address allocation on each of the normal nodes according to the IPV4 allocation result and the IPV6 allocation result;

wherein during the performing virtual IP address allocation on each of the normal nodes according to the IPV4 allocation result and the IPV6 allocation result, the processor, upon execution of the computer program, is configured to:

generate a final allocation result according to the IPV4 allocation result and the IPV6 allocation result; and perform virtual IP address allocation on each of the normal nodes according to the final allocation result.

9. A non-transitory computer-readable storage medium, storing a computer program that is executed by a processor, and upon execution by the processor, is configured to cause the processor to:

acquire, by a Cluster Trivial Database (CTDB) master node, a known Internet Protocol (IP) Version 4 (IPV4) virtual IP address parameter, a known IP Version 6 (IPV6) virtual IP address parameter, an available IPV4 virtual IP address parameter, and an available IPV6 virtual IP address parameter, wherein the known IPV4 virtual IP address parameter comprises a known IPV4 virtual IP address corresponding to each of normal nodes;

perform virtual IP address allocation calculation by use of the known IPV4 virtual IP address parameter and the available IPV4 virtual IP address parameter to obtain an IPV4 allocation result;

perform virtual IP address allocation calculation by use of the known IPV6 virtual IP address parameter and the available IPV6 virtual IP address parameter to obtain an IPV6 allocation result; and perform virtual IP address allocation on each of the normal nodes according to the IPV4 allocation result and the IPV6 allocation result;

wherein during the performing virtual IP address allocation on each of the normal nodes according to the IPV4 allocation result and the IPV6 allocation result, the computer program is configured to cause the processor to:

generate a final allocation result according to the IPV4 allocation result and the IPV6 allocation result; and perform virtual IP address allocation on each of the normal nodes according to the final allocation result.

10. The method for allocating the virtual IP address according to claim 2, the separating IPV4 parts and IPV6 parts in the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter comprises:

separating the IPV4 parts and the IPV6 parts in the known virtual IP address parameter and the available virtual IP address parameter respectively based on distinctive features of an IPV4 virtual IP address and an IPV6 virtual IP address to obtain, by the CTDB master node, the known IPV4 virtual IP address parameter and the known IPV6 virtual IP address parameter similar to the known virtual IP address parameter, and the available IPV4 virtual IP address parameter and the available IPV6 virtual IP address parameter similar to the available virtual IP address parameter.

11. The distributed storage device according to claim 8, wherein during the acquiring, by a CTDB master node, a known IPV4 virtual IP address parameter, a known IPV6 virtual IP address parameter, an available IPV4 virtual IP address parameter, and an available IPV6 virtual IP address parameter, the processor, upon execution of the computer program, is configured to:

acquire, by the CTDB master node, a known virtual IP address parameter and an available virtual IP address parameter, wherein the known virtual IP address parameter comprises a known virtual IP address corresponding to each of the normal nodes, and the available virtual IP address parameter comprises an available virtual IP address corresponding to each of the normal nodes; and separate IPV4 parts and IPV6 parts in the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter.

12. The distributed storage device according to claim 11, wherein when the known virtual IP address parameter and the available virtual IP address parameter are a known virtual IP address list and an available virtual IP address list respectively, during the separating IPV4 parts and IPV6 parts in the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter, the processor, upon execution of the computer program, is configured to:

traverse all known virtual IP addresses corresponding to each of the normal nodes in the known virtual IP address list, and record a first number and a second number, wherein the first number is a number of known IPV4 virtual IP addresses in the known virtual IP address list, and the second number is a number of known IPV6 virtual IP addresses in the known virtual IP address list;

generate a known IPV4 virtual IP address list and a known IPV6 virtual IP address list corresponding to the known virtual IP address list according to the first number and the second number, wherein a length of the known IPV4 virtual IP address list is the first number, and a length of the known IPV6 virtual IP address list is the second number;

traverse all available virtual IP addresses corresponding to each of the normal nodes in the available virtual IP address list, and record a third number and a fourth number, wherein the third number is a number of available IPV4 virtual IP addresses in the available virtual IP address list, and the fourth number is a number of available IPV6 virtual IP addresses in the available virtual IP address list; and generate an available IPV4 virtual IP address list and an available IPV6 virtual IP address list corresponding to the available virtual IP address list according to the third number and the fourth number, wherein a length of the available IPV4 virtual IP address list is the third number, and a length of the available IPV6 virtual IP address list is the fourth number.

13. The distributed storage device according to claim 8, wherein during the performing virtual IP address allocation on each of the normal nodes according to the IPV4 allocation result and the IPV6 allocation result, the processor, upon execution of the computer program, is configured to:
- in response to a determination that the IPV4 allocation result is null, determine the IPV6 allocation result as the final allocation result;
- in response to a determination that the IPV6 allocation result is null, determine the IPV4 allocation result as the final allocation result; and
- in response to a determination that both the IPV4 allocation result and the IPV6 allocation result are not null, connect the IPV6 allocation result to the IPV4 allocation result to generate the final allocation result.

14. The distributed storage device according to claim 8, wherein before the performing virtual IP address allocation calculation by use of the known IPV4 virtual IP address parameter and the available IPV4 virtual IP address parameter to obtain an IPV4 allocation result, the processor, upon execution of the computer program, is configured to:
- determine whether a condition is satisfied that the known IPV4 virtual IP address parameter comprises a known IPV4 virtual IP address corresponding to a target node or the available IPV4 virtual IP address parameter comprises an available IPV4 virtual IP address corresponding to any of the normal nodes, wherein the target node is any of the normal nodes, and the target node currently holds an IPV4 virtual IP address;
- in response to a determination that the condition is satisfied, perform the virtual IP address allocation calculation by use of the known IPV4 virtual IP address parameter and the available IPV4 virtual IP address parameter to obtain the IPV4 allocation result; and
- in response to a determination that the condition is not satisfied, perform the virtual IP address allocation calculation by use of the known IPV6 virtual IP address parameter and the available IPV6 virtual IP address parameter to obtain the IPV6 allocation result.

15. The distributed storage device according to claim 8, wherein a number of known IPV4 virtual IP addresses in the known IPV4 virtual IP address parameter is an integral multiple of a number of the normal nodes, and a number of known IPV6 virtual IP addresses in the known IPV6 virtual IP address parameter is an integral multiple of the number of the normal nodes.

16. The distributed storage device according to claim 8, wherein before the performing virtual IP address allocation on each of the normal nodes according to the IPV4 allocation result and the IPV6 allocation result, the processor, upon execution of the computer program, is configured to:
- determine whether the normal nodes comprise a reallocation node according to the IPV4 allocation result and the IPV6 allocation result, wherein a number of virtual IP addresses corresponding to the reallocation node is larger than a number of virtual IP addresses corresponding to an allocation target node by 2, and the allocation target node is any of the normal nodes;
- in response to a determination that the normal nodes do not comprise the reallocation node, perform the virtual IP address allocation on each of the normal nodes according to the IPV4 allocation result and the IPV6 allocation result; and
- in response to a determination that the normal nodes comprise the reallocation node, allocate one of IPV4 virtual IP addresses corresponding to the reallocation node in the IPV4 allocation result to a corresponding allocation target node, or allocate one of IPV6 virtual IP addresses corresponding to the reallocation node in the IPV6 allocation result to the corresponding allocation target node.

17. The distributed storage device according to claim 11, wherein during the separating IPV4 parts and IPV6 parts in the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter, the processor, upon execution of the computer program, is configured to:
- separate the IPV4 parts and the IPV6 parts in the known virtual IP address parameter and the available virtual IP address parameter respectively based on distinctive features of an IPV4 virtual IP address and an IPV6 virtual IP address to obtain, by the CTDB master node, the known IPV4 virtual IP address parameter and the known IPV6 virtual IP address parameter similar to the known virtual IP address parameter, and the available IPV4 virtual IP address parameter and the available IPV6 virtual IP address parameter similar to the available virtual IP address parameter.

18. The non-transitory computer-readable storage medium according to claim 9, wherein during the acquiring, by a CTDB master node, a known IPV4 virtual IP address parameter, a known IPV6 virtual IP address parameter, an available IPV4 virtual IP address parameter, and an available IPV6 virtual IP address parameter, the computer program is configured to cause the processor to:
- acquire, by the CTDB master node, a known virtual IP address parameter and an available virtual IP address parameter, wherein the known virtual IP address parameter comprises a known virtual IP address corresponding to each of the normal nodes, and the available virtual IP address parameter comprises an available virtual IP address corresponding to each of the normal nodes; and
- separate IPV4 parts and IPV6 parts in the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter.

19. The non-transitory computer-readable storage medium according to claim 18, wherein when the known virtual IP address parameter and the available virtual IP address parameter are a known virtual IP address list and an available virtual IP address list respectively, during the separating IPV4 parts and IPV6 parts in the known virtual IP address parameter and the available virtual IP address parameter respectively to obtain the known IPV4 virtual IP address parameter, the known IPV6 virtual IP address parameter, the available IPV4 virtual IP address parameter, and the available IPV6 virtual IP address parameter, the computer program is configured to cause the processor to:
- traverse all known virtual IP addresses corresponding to each of the normal nodes in the known virtual IP address list, and record a first number and a second number, wherein the first number is a number of known IPV4 virtual IP addresses in the known virtual IP address list, and the second number is a number of known IPV6 virtual IP addresses in the known virtual IP address list;

generate a known IPV4 virtual IP address list and a known IPV6 virtual IP address list corresponding to the known virtual IP address list according to the first number and the second number, wherein a length of the known IPV4 virtual IP address list is the first number, and a length of the known IPV6 virtual IP address list is the second number;

traverse all available virtual IP addresses corresponding to each of the normal nodes in the available virtual IP address list, and record a third number and a fourth number, wherein the third number is a number of available IPV4 virtual IP addresses in the available virtual IP address list, and the fourth number is a number of available IPV6 virtual IP addresses in the available virtual IP address list; and generate an available IPV4 virtual IP address list and an available IPV6 virtual IP address list corresponding to the available virtual IP address list according to the third number and the fourth number, wherein a length of the available IPV4 virtual IP address list is the third number, and a length of the available IPV6 virtual IP address list is the fourth number.

20. The non-transitory computer-readable storage medium according to claim 9, wherein during the performing virtual IP address allocation on each of the normal nodes according to the IPV4 allocation result and the IPV6 allocation result, the computer program is configured to cause the processor to:
 in response to a determination that the IPV4 allocation result is null, determine the IPV6 allocation result as the final allocation result;
 in response to a determination that the IPV6 allocation result is null, determine the IPV4 allocation result as the final allocation result; and
 in response to a determination that both the IPV4 allocation result and the IPV6 allocation result are not null, connect the IPV6 allocation result to the IPV4 allocation result to generate the final allocation result.

\* \* \* \* \*